United States Patent [19]
Blum et al.

[11] Patent Number: 5,264,545
[45] Date of Patent: Nov. 23, 1993

[54] SOLUTIONS OF POLYIMIDE-FORMING STARTING MATERIALS

[75] Inventors: Rainer Blum, Ludwigshafen; Hans J. Heller; Klaus Lienert, both of Hamburg, all of Fed. Rep. of Germany

[73] Assignee: BASF Lacke+Farben Aktiengesellschaft, Muenster, Fed. Rep. of Germany

[21] Appl. No.: 970,371

[22] Filed: Nov. 2, 1992

[51] Int. Cl.$^5$ ............... C08G 69/26; C08G 73/10
[52] U.S. Cl. ................... 528/353; 528/125; 528/128; 528/170; 528/172; 528/173; 528/176; 528/185; 528/188; 528/220; 528/229; 528/350; 524/379; 524/391; 524/600; 524/606; 524/607
[58] Field of Search ........... 528/125, 128, 170, 172, 528/173, 176, 188, 185, 220, 229, 353, 350; 524/379, 391, 600, 606, 607

[56] References Cited

U.S. PATENT DOCUMENTS

| | | | |
|---|---|---|---|
| 3,700,649 | 10/1972 | Boram et al. | 528/228 |
| 4,874,835 | 10/1989 | Berdahl | 528/179 |
| 4,960,824 | 10/1990 | Olson et al. | 528/188 |

Primary Examiner—John Kight, III
Assistant Examiner—P. Hampton-Hightower
Attorney, Agent, or Firm—Oblon, Spivak, McClelland, Maier & Neustadt

[57] ABSTRACT

Solutions of polyimide-forming starting materials are provided containing diamines and tetracarboxylic diesters; the tetracarboxylic diesters comprise a mixture of from 0.05 to 0.95 mol % of oxydiphthalic diesters and from 0.05 to 0.95 mol % of benzophenonetetracarboxylic diesters, biphenyltetracarboxylic diesters or mixtures thereof.

4 Claims, No Drawings

SOLUTIONS OF POLYIMIDE-FORMING STARTING MATERIALS

The present invention concerns solutions of polyimide-forming starting materials, containing diamines and tetracarboxylic diesters wherein the tetracarboxylic diesters comprise a mixture of

| from 0.05 to 0.95 mol % | of oxydiphthalic diesters and |
| from 0.05 to 0.95 mol % | of benzophenonetetracarboxylic diesters, biphenyltetracarboxylic diesters or mixtures thereof. |

The present invention further relates to the use of these solutions for preparing coatings.

Polyimides are increasingly used for coating metal wires, glass and quartz fibers, and substrates made of silicon (silicon wafers). More particularly, they are used in electronics and microelectronics, for example as intermediate or top layers in the building up of circuits.

In general this involves coating substrates with solutions of polyimides or polyamidic acids, and in the case of the polyamidic acid the imidation then takes place on the substrate surface.

The solutions of polyimides and polyamidic acids, however, need to be relatively low an concentration in order that a sufficiently low processing viscosity may be obtained. Typical commercial products generally have a solids content of only from 12 to 20% by weight.

The result of the low concentration is a high degree of shrinkage in the course of drying. This shrinkage results in a more or less pronounced copying of the structure underneath the polyimide layer into the polyimide surface.

Especially in the case of multilayer coatings, necessary for example for circuits, this produces inaccuracies in the buildup.

For this reason and to avoid excessively large solvent quantities it would be desirable to have more concentrated solutions. Higher concentrations are possible in principle with solutions which contain only the starting materials for the polyimides. However, since solutions of tetracarboxylic dianhydrides and diamines are not storage stable and polymerize with time, tetracarboxylic diesters are used instead of the tetracarboxylic dianhydrides.

U.S. Pat. No. 3,700,649 describes solutions of benzophenonetetracarboxylic diesters and diamines with a very low basicity for preparing polyimide coatings.

U.S. Pat. No. 4,874,835 concerns solutions of diamines and diesters of oxydiphthalic acid with alkanols.

U.S. Pat. No. 4,960,824 discloses solutions of diesters of araliphatic tetracarboxylic acids with alkanols and at least one diamine selected from m-phenylenediamine, p-phenylenediamine or 4-aminophenyl ether.

However, polyimide coatings prepared from solutions of the starting materials still have many disadvantages, such as blistering and inadequate planarity of the coatings.

It is an object of the present invention to eliminate these disadvantages.

We have found that this object is achieved by the solutions defined at the beginning and by their use for preparing polyimide coatings.

It has been found that particularly advantageous polyimide coatings are obtained on using as tetracarboxylic diester a mixture of from 0.05 to 0.95, in particular from 0.2 to 0.8, mol % of oxydiphthalic diesters and from 0.05 to 0.95, in particular from 0.2 to 0.8, mol % of benzophenonetetracarboxylic diesters, biphenyltetracarboxylic diesters or mixtures thereof. The mol % are based on the total amount of tetracarboxylic diester.

As possible isomeric forms of the oxydiphthalic diester it is possible to mention in particular those which are derived from 3,3'- or 4,4'-oxydiphthalic acid.

As possible isomers of the benzophenonetetracarboxylic diester and biphenyltetracarboxylic diester there may be mentioned in particular those which are derived from 3,3'4,4'- or 2,2',3,3'-biphenyltetracarboxylic acid or from 3,3',4,4'- or 2,2',3,3'-benzphenonetetracarboxylic acid.

The ester groups in the tetracarboxylic diesters can be derived for example from $C_1$-$C_8$-alkanols.

Preferably, the ester groups are derived to an extent of at least 2 mol %, based on all the ester groups, from alcohols of the general formula

where Z is a straight-chain or branched aliphatic radical of from 1 to 15, preferably from 1 to 8, carbon atoms which may be interrupted by from 1 to 4, preferably 1-2, ether groups —O— and X is an aromatic radical of from 5 to 20 carbon atoms which may also contain nitrogen, oxygen or sulfur in the aromatic ring system. Very particularly preferably, X is a phenyl ring and Z is a $C_1$-$C_8$-alkylene radical.

As alcohols of the formula I there may be mentioned for example monophenoxyethylene glycol or monophenoxypropylene glycol.

As alcohols of the formula II it is possible to mention for example benzyl alcohol, 1-hydroxy-2-phenylethane and 1-hydroxy-3-phenylpropane.

Furthermore, in minor amounts it is also possible to use polyfunctional alcohols.

Preferably, at least 10, particularly preferably at least 30, mol % of the ester groups in the diesters are. derived from alcohols of the general formula I or II.

Very particularly preferably, all the ester groups in the diesters are derived from alcohols of the general formula I or II.

The preparation of the tetracarboxylic diesters can be effected in a simple way by esterifying the tetracarboxylic dianhydrides with the abovementioned alcohols in a conventional manner. In the course of the esterification the anhydride rings. are split, and one anhydride ring gives rise to an ester group and a carboxylic acid group. Substantially no further esterification of the still remaining carboxylic acid groups takes place, so that tetracarboxylic tetraesters or triesters are available only in minor amounts even if the alcohol is present in a large excess. The esterification is preferably carried out at from 50° to 150° C. If desired, it is also possible to add esterification catalysts, for example dimethylaminopyridine.

The tetracarboxylic diesters can also be prepared by other methods, for example by direct esterification of the tetracarboxylic acids.

Suitable diamines are in particular aromatic or partly aromatic diamines which contain at least one aromatic group. These diamines can be diamines with one aromatic ring, with fused aromatic ring systems or aromatic rings which are joined together for example by a single bond, an ether, carbonyl or sulfonyl group or aliphatic hydrocarbon radicals, in particular of from 1 to 8 carbon atoms and with or without hetero atoms such as sulfur, nitrogen or oxygen. The aromatic rings or ring systems may carry as substituents in particular $C_1$-$C_8$-alkyl or -alkoxy groups or halogen atoms such as chlorine or fluorine.

Examples are benzidine, dimethylbenzidine, dimethoxybenzidine, diethoxybenzidine, diaminodiphenyl sulfone, diaminodiphenylpropane, diaminodiphenyl sulfide, 4,4'-bis[2-(4-aminophenyl)propane]phenylene/-bisaniline P, 4,4'-dimethyl-3,3,-diaminodphenyl sulfone, 4,4'-dimethyl-3,3'-diaminodiphenyl sulfide, p-phenylenediamine, m-phenylenediamine, diethyltoluylenediamine, diaminomethoxybenzene, xylylenediamine, diaminocumene, diaminonaphthalene, diaminonaphthol, diaminonaphthoquinone, diaminoanthracene, diaminoanthraquinone, diaminophenanthrene, 9,10-bis(4-aminophenyl)anthracene, 3,5-diethyl-2,4-diaminotoluene, 3,5-diethyl-2,6-diaminotoluene, diisopropylphenylenediamine, 4,4,-methylenebis(2,6-diisopropylaniline), 4,4'-methylenebis(2-methyl-6-isopropylaniline), 2,6-diisopropylaniline, 1,3-diamino-4-methoxybenzene, hexafluoro-2,2-bis(3-amino-4,5-dimethylphenyl)propane, 2,2-bis(4,4'-aminophenyl)propane, bis(4,4'-aminophenyl) sulfone, bis(4,4'-aminophenyl) sulfide, bis(3,3'-aminophenyl) sulfone, bis(3,3'-aminophenyl) sulfide, 2,2-bis[4-(4-aminophenoxy)phenyl]propane, 2,2-bis[4-(4-aminophenoxy)phenyl]hexafluoropropane, propane, bis[4-(4-aminophenoxy)phenyl]sulfone, bis]4-(4-aminophenoxy)phenyl]sulfide 2,2-bis[4-(3-aminophenoxy)phenyl]hexafluoropropane, bis[4-(3-aminophenoxy)phenyl]sulfone, bis-[4-(3-aminophenoxy)phenyl]sulfide, 4,4'-bis(4-aminophenoxy)-biphenyl, 4,4'-bis(3-aminophenoxy)biphenyl, 1,4'-bis(4-aminophenoxy)phenylene, 1,3'-bis(4-aminophenoxy)phenylene, diaminodiphenylmethane, diaminodiphenoxyphenyl sulfone, diaminodiphenoxyphenyl sulfide, diaminodiphenyl oxide, diaminopyridine, bis(4-aminophenyl)dialkylsilane, 3,3'-dihydroxy-4,4'-diaminobiphenyl, 9,9'-bis(4-amino)fluorene, o-toluidine sulfone, diaminobenzanilide, acridinediamine and methylenebisanthranilamide.

Of industrial importance are in particular diaminodiphenylmethane, diaminodiphenyl oxide, 2,2-bis[4-(4-aminophenoxy)phenyl]propane, diaminodiphenyl sulfide and diaminodiphenyl sulfone. It is also possible to use in particular mixtures of diamines.

Suitable solvents for the tetracarboxylic diesters and diamines are for example polar organic solvents, such as aliphatic or aromatic alcohols, ethers, ketones, aldehydes or esters.

Preference is given to highly polar solvents such as N-methylpyrrolidone, formamide, dimethylformamide, alkylalkylenediureas such as dimethylethylenediurea or dimethylpropylenediurea, dimethyl sulfoxide, butyrolactone, pyrrolidone, dialkylacetamide but also glycols, glycol esters and glycol ethers.

As solvents it is obviously also possible to use the alcohol customarily used in excess in the preparation of tetracarboxylic diesters.

The choice of solvent or solvent mixture depends essentially only on the solubility or polarity of the tetracarboxylic diesters and diamines.

If desired it is also possible to use apolar solvents such as aliphatic or aromatic hydrocarbons in solvent mixture.

The solutions according to the invention preferably contain the tetracarboxylic diesters and the diamine in a molar ratio of from 1.5:1 to 1:1.5; the molar ratio is particularly preferably about 1:1.

The solids content of the solution is preferably from 30 to 60% by weight.

To prepare the solutions it is possible to add the tetracarboxylic diester, the diamine and the solvent together in any desired order. For example, it is possible first to prepare the tetracarboxylic diester by reacting a tetracarboxylic dianhydride with an excess of alcohol and to add the diamine with or without further solvent to the resulting mixture. To dissolve all the components the mixture is stirred if necessary at room temperature or else at elevated temperature, for example at from 30° to 120° C., in particular at 40°-80° C.

The solutions of the invention may contain customary additives, such as catalysts for the imide formation, dyes, pigments, fillers, flow control agents and viscosity regulators.

They are suitable for use as coating agents for preparing coatings on a wide range of substrates, for example metal, glass or silicon. The hardening of the coating is preferably effected at final temperatures of from 150° to 450° C., particularly preferably at from 300° to 400° C. It is particularly advantageous to carry out the hardening process in multiple stages by raising the temperature stage by stage until the final temperature is obtained.

The solution of the invention can also be used to prepare thick blister-free planar coatings.

EXAMPLES

| Abbreviations | |
|---|---|
| ODPA | Oxydiphthalic dianhydride |
| PMDA | Pyromellitic dianhydride |
| BTDA | Benzophenonetetracarboxylic dianhydride |
| BAPP-D | 2.2,-Bis[4-(3.4-dicarboxyphenoxy)phenyl]propane dianhydride |
| F-BPDA | Hexafluoroisopropylidene-2,2-bis(phthalic anhydride) |
| BPDA | Biphenyltetracarboxylic dianhydride |
| DADO | Diaminodiphenyl oxide |
| BAPP | 2,2-Bis[-(4-ainophenoxy)phenyl]propane |
| HF-BAPP | 2,2-Bis[-(4-aminophenoxy)phenyl]hexafluoropropane |
| m-PDA | m-Phenylenediamine |
| p-PDA | p-Phenylenediamine |
| MEG | Monophenoxyethylene glycol |
| MPG | Monophenoxypropylene glycol |
| BZA | Benzyl alcohol |
| E | Ethyl alcohol |
| M | Methanol |
| S 100 | Solvesso 100 TM ($C_1$-$C_6$-alkylbenzene mixture from ESSO) |
| NMP | N-Methylpyrrolidone |
| DMAC | Dimethylacetamide |
| BLAC | Butyrolactone |
| DMAP | Dimethylaminopyridine |

In the examples and comparative examples which follow, first the tetracarboxylic diesters were prepared by reacting the tetracarboxylic dianhydrides with alcohol at 100° C. (30 min) and in the presence of dimethylaminopyridine as catalyst and the first aliquot NMP. After cooling to 60° C., the diamines were added with or without further solvent and the mixture was stirred until a solution had formed. Starting Materials

Example 1

27.92 g of ODPA (0.09 mol)
3.23 g of BTDA (0.01 mol)
1.53 g of MPG (0.01 mol)
5.44 g of M (0.17 mol)
0.36 g of water (0.02 mol)
27.39 g of NMP
0.25 g of DMAP
41.02 g of BAPP (0.10 mol) and
30.00 g of NMP

Example 2

24.82 g of ODPA (0.08 mol)
8.88 g of 6F-BPDA (0.02 mol)
5.53 g of MEG (0.04 mol)
6.90 g of E (0.15 mol)
0.18 g of water (0.01 mol)
24.66 g of NMP
0.25 g of DMAP
41.02 g of BAPP (0.10 mol) and
30.00 g of NMP

Example 3

15.51 g of ODPA (0.05 mol)
16.15 g of BTDA (0.05 mol)
13.80 g of E (0.30 mol)
20.00 g of NMP
0.25 g of DMAP
20.00 g of DADO (0.10 mol) and
21.34 g of NMP

Example 4

14.71 g of BPDA (0.05 mol)
15.51 g of ODPA (0.05 mol)
13.80 g of E
20.00 g of NMP
0.25 g of DMAP
20.00 g of DADO (0.10 mol) and
19.58 g of NMP

Example 5

52.00 g of BAPP-DA (0.09 mol)
3.10 g of ODPA (0.01 mol)
13.80 g of E (0.30 mol)
20.00 g of NMP
0.25 g of DMAP
20.00 g of DADO (0.10 mol) and
46.20 g of NMP

Comparative Example 1

31.02 g of ODPA (0.10 mol)
9.20 g of E (0.20 mol)
5.17 g of NMP
0.25 g of DMAP
10.80 g of p-PDA (0.10 mol)
20.00 g of NMP

Comparative Example 2

32.30 g of BTDA (0.10 mol)
13.80 g of E (0.30 mol)
20.00 g of NMP
0.25 g of DMAP
20.00 g of DADO (0.10 mol) and
22.20 g of NMP

Comparative Example 3

31.02 g of ODPA (0.10 mol)
13.80 g of E (0.30 mol)
20.00 g of NMP
0.25 g of DMAP
20.00 g of DADO (0.10 mol) and
20.55 g of NMP

Comparative Example 4

29.42 g of BPDA (0.10 mol)
13.80 g of E (0.30 mol)
20.00 g of NMP
0.25 g of DMAP
20.00 g of DADO (0.10 mol) and
18.82 g of NMP

Comparative Example 5

32.50 g of BTDA diethyl ester (0.079 mol)
76.00 g of 2:1 dioxane/NMP were introduced first followed by a solution of
23.30 g of DADO (0.17 mol) in
54.00 g of dioxane/NMP.

Testing of examples

The lacquers were applied with a draw bar having a wedge-shaped slot of from 0 to 1000 μm to degreased steel panels, which were placed into a program controlled oven which had been preheated to 50° C., heated to 350° C. at a rate of 5° C./min, left at 350° C. for 30 min, removed from the oven and cooled down to room temperature.

In general, the films then have blisters on the thickly coated side. These blisters can be individual blisters of varying size or foamy layers. Using a magnetic layer thickness meter the layer thickness at which the first blisters appeared ($d_{max}$) was determined.

Similarly, the brittleness of the films was assessed.

The table additionally indicates the solids content of the solutions (sum of weight proportions of the tetracarboxylic diesters and amines) and their solution viscosity.

Similarly, the imidation residue (mass after two hour imidation at 400° C. based on the mass of the solution) and the water loss in the course of the imidation (difference between solids content and imidation residue) were calculated.

TABLE

| | SC [%] | IR [%] | MV [%] | LV [mPas] | $d_{max}$ [μm] | planarity of films | Brittleness and |
|---|---|---|---|---|---|---|---|
| E1 | 57.9 | 50 | | 7.9 | 640 | >300 | elastic, planar |
| E2 | 61.4 | 50 | | 11.4 | 560 | >300 | elastic, planar |
| E3 | 56.9 | 45 | | 11.9 | 420 | 210 | elastic, planar |

TABLE-continued

| SC | IR [%] | MV [%] | LV [mPas] | $d_{max}$ [μm] | Brittleness and planarity of films | |
|---|---|---|---|---|---|---|
| E4 | 59.4 | 45 | 14.4 | 620 | 190 | elastic, planar |
| E5 | 53.5 | 45 | 8.5 | 580 | 240 | elastic, planar |
| CE1 | 66.1 | 50 | 16.1 | 450 | — | crumbs, no films possible |
| CE2 | 57.3 | 45 | 13.3 | <300 | <10 | brittle |
| CE3 | 57.2 | 45 | 12.2 | <300 | 26 | brittle |
| CE4 | 57.7 | 45 | 12.7 | <300 | <12 | brittle |
| CE5 | 29.6 | 27.7 | 1.9 | <300 | <12 | brittle |

We claim:

1. A solution of polyimide-forming starting materials, comprising at least one aromatic or partly aromatic diamine containing at least one aromatic group and a mixture of tetracarboxylic diesters, wherein said mixture of tetracarboxylic diesters comprises
   from 0.05 to 0.95 mol % of oxydiphthalic diesters and
   from 0.05 to 0.95 mol % of benzophenonetetracarboxylic diesters, biphenyltetracarboxylic diesters or mixtures thereof.

2. A polyimide-coated article which article has been coated with the solution as claimed in claim 1 and hardened.

3. A solution of polyimide-forming starting materials as claimed in claim 1, wherein said mixture of tetracarboxylic diesters comprises
   from 0.02 to 0.8 mol % of oxydiphthalic diesters and
   from 0.02 to 0.8 mol % of benzophenonetetracarboxylic diesters, biphenol tetracarboxylic, tetracarboxylic diesters or mixtures thereof.

4. A solution of polyamide-forming starting materials as claimed in claim 1, wherein the solids content of the solution is from 30 to 60% by weight.

* * * * *